United States Patent
Liu et al.

(10) Patent No.: US 11,133,959 B1
(45) Date of Patent: Sep. 28, 2021

(54) APPARATUSES AND METHODS FOR ROUTING PACKETS FOR A TIME-SENSITIVE NETWORKING (TSN) NETWORK BY VIRTUAL LOCAL AREA NETWORK (VLAN) TAG REPLACEMENT

(71) Applicant: MOXA INC., New Taipei (TW)

(72) Inventors: Chi-Chuan Liu, New Taipei (TW);
Chun-Yu Lin, New Taipei (TW);
Chien-Yu Lai, New Taipei (TW);
Wen-Lu Liao, New Taipei (TW)

(73) Assignee: MOXA INC., New Taipei (TW)

( * ) Notice: Subject to any disclaimer, the term of this patent is extended or adjusted under 35 U.S.C. 154(b) by 0 days.

(21) Appl. No.: 16/901,211

(22) Filed: Jun. 15, 2020

(51) Int. Cl.
*G06F 15/173* (2006.01)
*H04L 12/46* (2006.01)
*H04L 29/06* (2006.01)

(52) U.S. Cl.
CPC ...... *H04L 12/4645* (2013.01); *H04L 12/4633* (2013.01); *H04L 12/4679* (2013.01); *H04L 65/608* (2013.01)

(58) Field of Classification Search
CPC ............. H04L 12/4645; H04L 12/4633; H04L 12/4641; H04L 12/4679; H04L 65/608
USPC ........................................................ 709/238
See application file for complete search history.

(56) References Cited

U.S. PATENT DOCUMENTS

| | | | | |
|---|---|---|---|---|
| 7,558,273 B1 * | 7/2009 | Grosser, Jr. | ......... | H04L 12/4645 370/389 |
| 2007/0189262 A1 * | 8/2007 | Kim | .................. | H04W 72/1221 370/347 |
| 2018/0309655 A1 * | 10/2018 | Joseph | ................ | G06F 11/2294 |
| 2019/0058692 A1 * | 2/2019 | Mittal | ................ | H04L 41/0893 |
| 2020/0259896 A1 * | 8/2020 | Sachs | ................ | G07C 9/00174 |

FOREIGN PATENT DOCUMENTS

| | | | | |
|---|---|---|---|---|
| WO | 2020/098917 A1 | 5/2020 | | |
| WO | WO-2020098917 A1 * | 5/2020 | ............. | H04L 69/08 |
| WO | WO-2020128683 A1 * | 6/2020 | ......... | H04L 41/0893 |
| WO | WO-2020136487 A2 * | 7/2020 | ....... | H04L 12/40156 |
| WO | WO-2020143900 A1 * | 7/2020 | ............. | H04L 47/28 |

OTHER PUBLICATIONS

European Search Report dated Nov. 12, 2020, issued in application No. EP 20186170.5.

(Continued)

*Primary Examiner* — Ruolei Zong
(74) *Attorney, Agent, or Firm* — McClure, Qualey & Rodack, LLP

(57) ABSTRACT

An apparatus including a storage medium and a controller is provided. The storage medium stores a mapping of stream Identifiers (IDs) to Virtual Local Area Network (VLAN) tags. The controller is coupled to the storage medium and configured to route a packet for a Time-Sensitive Networking (TSN) network according to the mapping. The routing of the packet includes replacing a VLAN tag in the packet according to the stream ID of the packet and the mapping, so as to maintain the real-time deterministic behavior of delivering data streams in the TSN network.

16 Claims, 6 Drawing Sheets

(56) References Cited

OTHER PUBLICATIONS

Gerhard, T., et al.; "Software-defined Flow Reservation Configuring IEEE 802.1Q Time-Sensitive Networks by the Use of Software-Defined Networking;" 2019 24th IEEE International Conference on Emerging Technologies and Factory Automation (ETFA), IEEE; Sep. 2019; pp. 216-223.

ZTE; "Discussion on configuration and scheduling on the 5G virtual bridge", 3GPP Draft; S2-1909429 Discussion on Configuration and Scheduling on the 5G Virtual Bridge, 3rd Generation Partnership Project (3GPP); Mobile Competence Centre; 650, Route Des Lucioles; F-06921 Soph, vol. SA WG2, No. Split, Croatia; Oct. 14, 2019-Oct. 18, 2019; Oct. 2019; pp. 1-4.

\* cited by examiner

APPARATUSES AND METHODS FOR ROUTING PACKETS FOR A TIME-SENSITIVE NETWORKING (TSN) NETWORK BY VIRTUAL LOCAL AREA NETWORK (VLAN) TAG REPLACEMENT

BACKGROUND OF THE APPLICATION

Field of the Application

The application generally relates to Time-Sensitive Networking (TSN), and more particularly, to apparatuses and methods for routing packets for a TSN network by Virtual Local Area Network (VLAN) tag replacement

Description of the Related Art

The rise of new digital industrial technology, known as Industry 4.0, is a transformation that makes it possible to gather and analyze data across machines, enabling faster, more flexible, and more efficient processes to produce higher-quality goods at reduced costs. One of the core entities in the center of Industry 4.0 are cyber-physical systems. By definition, these systems require a representation in cyberspace. For that, the Operations Technology (OT) networks which connect the production equipment and the Information Technology (IT) networks from the upper factory layers will need to converge.

Unfortunately, most of the industrial Ethernet standards from the current generation require proprietary hardware. This makes the convergence of networks close to impossible. The consequences are island networks that need gateways to be connected to other hierarchies. To meet these trends, Time-Sensitive Networking (TSN) technology has been proposed by the Institute of Electrical and Electronics Engineers (IEEE) 802.1 working groups which combines a set of IEEE standards in order to achieve real-time deterministic behavior, while being both vertically and horizontally scalable.

However, due to the TSN standards are still being under discussion among the IEEE 802.1 working groups, many details are not yet defined, including how to handle the data streams between TSN networks and non-TSN networks while maintaining the real-time deterministic behavior of delivering the data streams in TSN networks.

BRIEF SUMMARY OF THE APPLICATION

The present application proposes to replace the Virtual Local Area Network (VLAN) tags in the packets of a data stream being routed at a network gateway between a TSN network to a non-TSN network or at a network switch/router/bridge within a TSN network according to a mapping of steam Identifiers (IDs) to VLAN tags, which is provided by a Central Network Configuration (CNC) server, thereby maintaining the real-time deterministic behavior of delivering the data stream in the TSN network.

In one aspect of the application, an apparatus comprising a storage medium and a controller is provided. The storage medium is configured to store a mapping of one or more first stream IDs and one or more first VLAN tags. The controller is coupled to the storage medium, and configured to route at least one packet for a TSN network according to the mapping. Specifically, the routing of the packet comprises the following steps: identifying a second stream ID of the packet; determining whether the second stream ID matches one of the first stream IDs in the mapping; and in response to the second stream ID matching one of the first stream IDs, replacing a second VLAN tag in the packet with the first VLAN tag corresponding to the matched first stream ID in the mapping.

In another aspect of the application, a method, executed by an apparatus connected to a TSN network, is provided. The method comprises the step of: routing at least one packet for the TSN network according to a mapping of one or more first stream Identifiers (IDs) to one or more first Virtual Local Area Network (VLAN) tags. Specifically, the routing of the packet comprises the following steps: identifying a second stream ID of the packet; determining whether the second stream ID matches one of the first stream IDs in the mapping; and in response to the second stream ID matching one of the first stream IDs, replacing a second VLAN tag in the packet with the first VLAN tag corresponding to the matched first stream ID in the mapping.

In yet another aspect of the application, a CNC server comprising a network interface device and a controller is provided. The network interface device is configured to provide connections to a first apparatus and a second apparatus in a TSN network. The controller is coupled to the communication device, and configured to receive from the first apparatus and the second apparatus information of routing at least one packet between the first apparatus and the second apparatus, and update a respective mapping of one or more first stream IDs to one or more first VLAN tags in each of the first apparatus and the second apparatus according to the information, thereby enabling each of the first apparatus and the second apparatus to replace a second VLAN tag in the packet with the first VLAN tag corresponding to the a second stream ID of the packet according to the mappings.

Other aspects and features of the present application will become apparent to those with ordinarily skill in the art upon review of the following descriptions of specific embodiments of the apparatuses and methods for routing packets for a TSN network by VLAN tag replacement.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
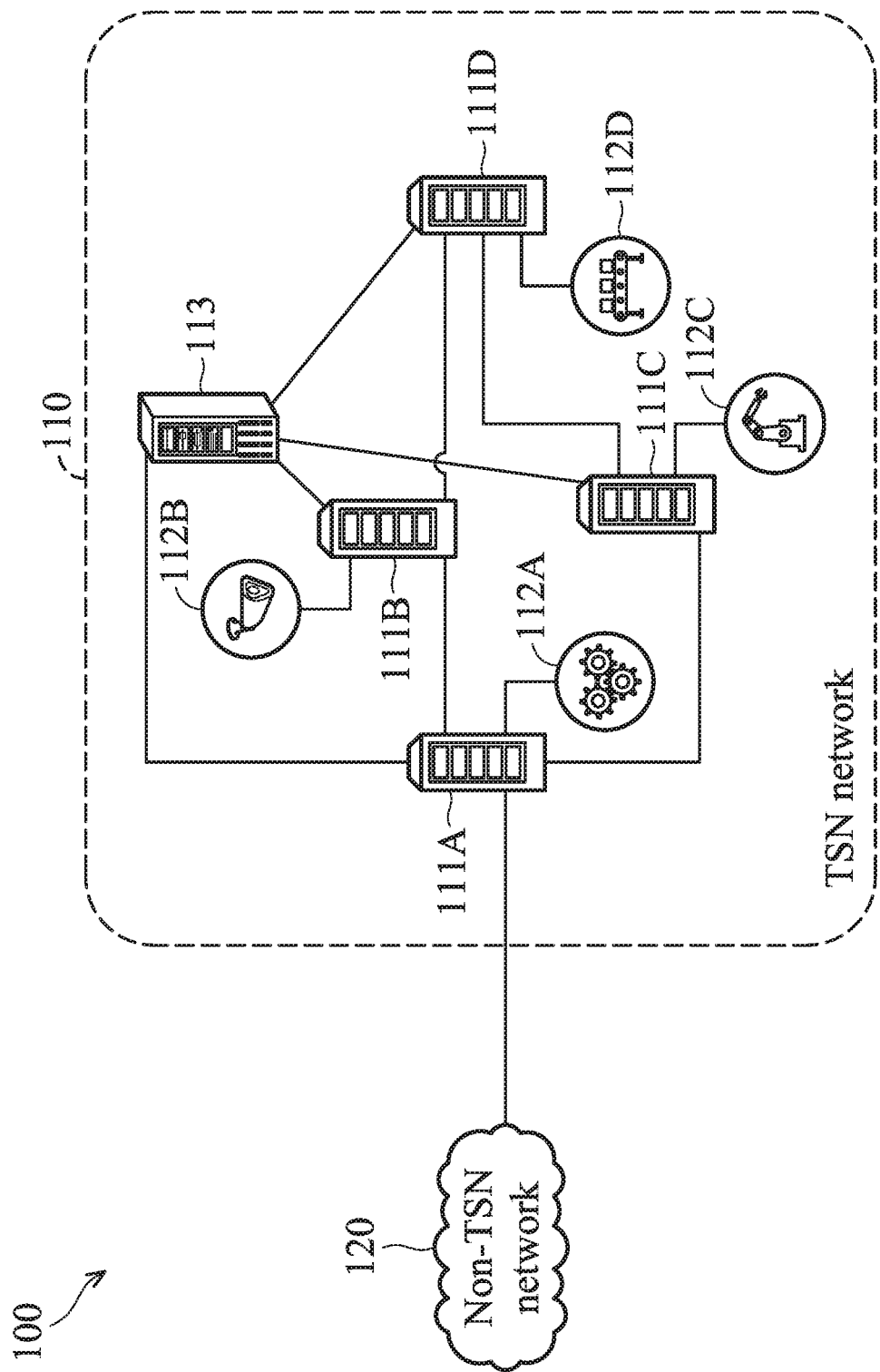
FIG. 1 is a block diagram of a heterogeneous network environment according to an embodiment of the application.

FIG. 1 is a block diagram of a heterogeneous network environment according to an embodiment of the application.

As shown in FIG. 1, the heterogeneous network environment 100 includes a TSN network 110 and a non-TSN network 120, wherein the TSN network 110 and the non-TSN network 120 are connected by a TSN gateway 111A to enable interoperability between the TSN network 110 and the non-TSN network 120.

The TSN network 110 may include multiple network devices 111A-111D, wherein the network device 111A may be a TSN gateway and the network devices 111B-111D may be TSN switches/routers/bridges. In addition, the TSN network 120 may include multiple terminal devices 112A-112D and a Central Network Configuration (CNC) server, wherein the CNC server 113 is connected with the network devices 111A-111D to manage the configuration of the network devices 111A-111D. Each of the network devices 111A-111D may connect with one or more terminal devices. For example, the network device 111A is connected with a machinery 112A, the network device 111B is connected with a security camera 112B, the network device 111C is connected with a robotic arm 112C, and the network device 111D is connected with a conveyor 112D.

Each of the network devices 111A-111D is responsible for connecting the terminal devices 112A-112D in the TSN network 110, to enable real-time deterministic communication within the TSN network 110. In addition, one of the network devices, such as the network device 111A, is configured to serve as a TSN gateway connecting the non-TSN network 120 and the TSN network 110 for routing packets of data streams between the non-TSN network 120 and the TSN network 110.

The CNC server 113 is responsible for managing the configuration of the network devices 111A and 111D to realize real-time deterministic communication within the TSN network 110. Specifically, the CNC server 113 may perform the topology discovery procedure to determine the topology of the TSN network 110, and based on the topology and other factors, determine the communication paths for packets of data streams routed in the TSN network 110. The other factors may include the latency information of the data streams communicated in the TSN network 110, and the loading information of the network devices 111A-111D for routing the packets of the data streams.

In one embodiment, the CNC server 113 may provide a mapping of stream Identifiers (IDs) and Virtual Local Area Network (VLAN) tags to the network device 111A, to configure the communication paths for packets routed between the TSN network 110 and the non-TSN network 120. Likewise, the CNC server 113 may provide a respective mapping of stream IDs and VLAN tags to each of the network devices 111B-111D, to indicate the communication paths for packets routed within the TSN network 110.

Specifically, the mappings provided to the network devices 111A-111D are determined based on the topology of the TSN network 110, and the stream IDs and the latency information of the data streams and/or the loading information of the network devices 111A-111D.

Each stream ID in the mappings may be presented as at least one of the following: a Destination Address (DA), a Source Address (SA), a VLAN ID (VID), a Priority Code Point (PCP), an Ethertype, and a Subtype. That is, any combination of the DA, SA, VID, PCP, Ethertype, and Subtype may be used to present a stream ID. Specifically, the DA, the SA, VID, PCP, and the Ethertype are header fields of an Ethernet packet in compliance with the TSN standards specified by IEEE 802.1 working groups, while the Subtype is a portion of the payload field of an Ethernet packet in compliance with the TSN standards specified by IEEE 802.1 working groups.

In one embodiment, each stream ID in the mappings may be presented as a combination of an Ethertype and a Subtype (e.g., the first byte of the payload field), and each of the VLAN tags in the mappings may include a VID and a PCP, wherein the VID and the PCP are header fields in an Ethernet packet in compliance with TSN standards specified by IEEE 802.1 working groups.

In another embodiment, each stream ID in the mappings may be presented as a combination of a DA and an SA, and each VLAN tag in the mappings may include a VID and a PCP.

In another embodiment, each stream ID in the mappings may be presented as a combination of a VID and a PCP, and the application should not be limited thereto.

Based on the received mapping, each of the network devices 111A-111D may look up the mapping to see if the stream ID of a packet matches one of the stream IDs in the mapping. For example, if there's a match, the network device 111A/111B/111C/111D may perform VLAN tag replacement to the packet. By replacing the VLAN tag in the packet, the packet may be routed in a communication path with deterministically bounded latency, thereby maintaining the real-time deterministic behavior of delivering the data stream in the TSN network 110.

It should be understood that the components described in the embodiment of FIG. 1 are for illustrative purposes only and are not intended to limit the scope of the application. For example, the TSN network 110 may include less or more network devices and terminal devices. Alternatively, the TSN network 110 may be connected between two non-TSN networks to allow data streams to be communicated between the non-TSN networks via the TSN network 110.

Figure 2:
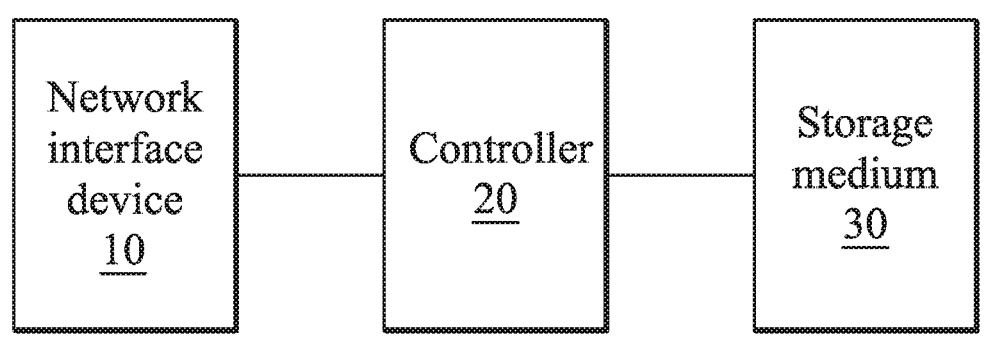
FIG. 2 is a block diagram illustrating a network switch or a CNC server according to an embodiment of the application.

FIG. 2 is a block diagram illustrating a network device or a CNC server according to an embodiment of the application.

As shown in FIG. 2, a network device or a CNC server may include a network interface device 10, a controller 20, and a storage medium 30.

The network interface device 10 is configured to provide the function of data streams communication (e.g., over Ethernet) within the TSN network 110 or between the TSN network 110 and the non-TSN network 120.

The controller 20 may be a general-purpose processor, a Micro Control Unit (MCU), a Digital Signal Processor (DSP), or the like, which includes various circuits for providing the functions of data processing and computing, controlling the network interface device 10 for communicating data streams within the TSN network 110 or between the TSN network 110 and the non-TSN network 120, and storing and retrieving data (e.g., mapping(s) of stream IDs to VLAN tags) to and from the storage medium 30.

In particular, the controller 20 coordinates the aforementioned operations of the network interface device 10 and the storage medium 30 for performing the methods of the present application.

As will be appreciated by persons skilled in the art, the circuits of the controller 20 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage medium 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., mapping(s) of stream IDs to VLAN tags), instructions, and/or program code of applications, communication protocols, and/or the methods of the present application.

It should be understood that the components described in the embodiment of FIG. 2 are for illustrative purposes only and are not intended to limit the scope of the application. For example, a network device or a CNC server may include more components, such as an Input/Output (I/O) device (e.g., one or more buttons, one or more light emitters, a speaker, a keyboard, a mouse, a touch pad, and/or a display device).

Figure 3:
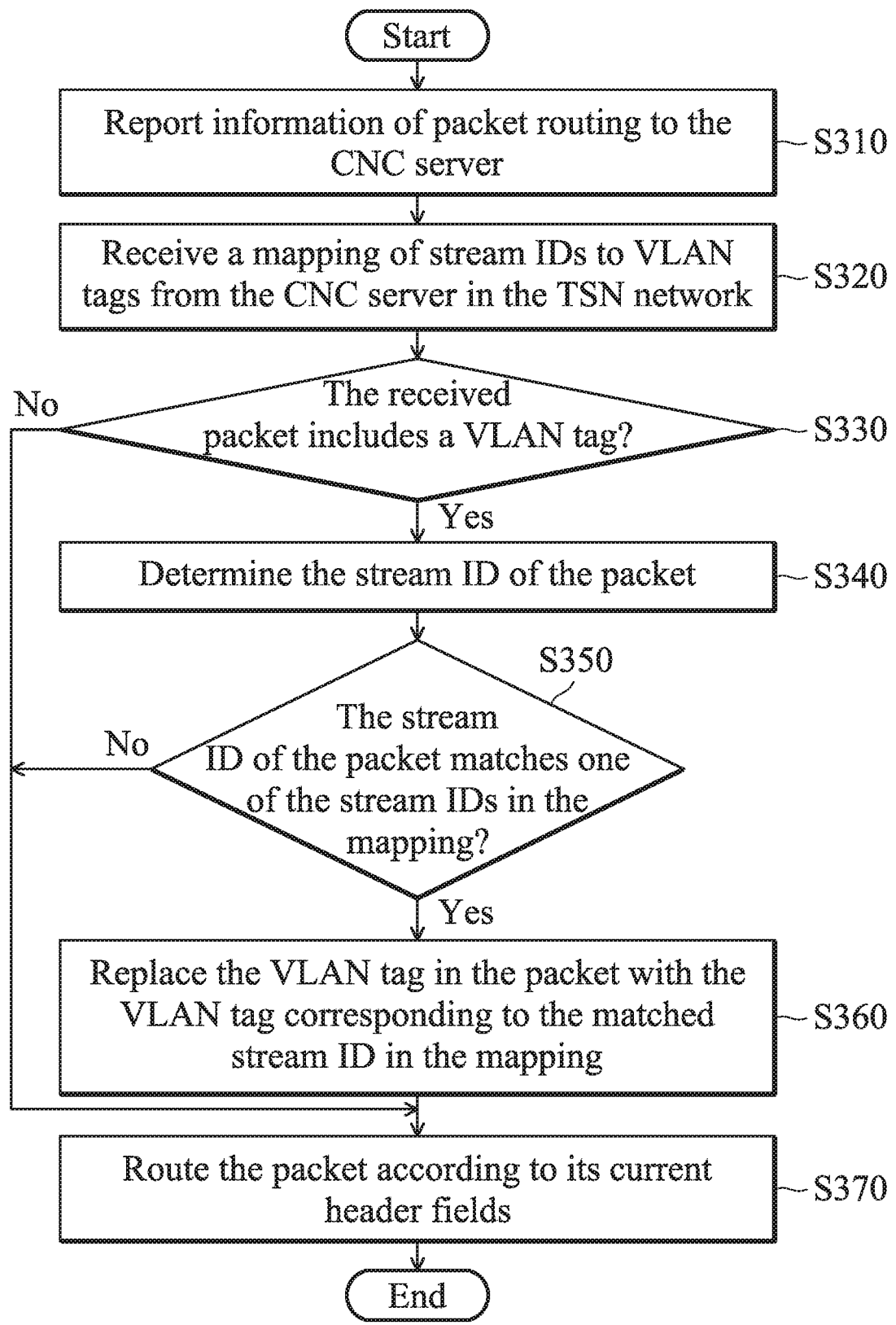
FIG. 3 is a flow chart illustrating the method for routing packets between a TSN network and a non-TSN network according to an embodiment of the application.

FIG. 3 is a flow chart illustrating the method for routing packets for a TSN network according to an embodiment of the application.

In this embodiment, the method may be applied to and executed by a network device connecting a TSN network (e.g., the TSN network 110). For example, the method may be applied to and executed by the network gateway 111A connecting a TSN network (e.g., the TSN network 110) and a non-TSN network (e.g., the non-TSN network 120). Alternatively, the method may be applied to and executed by the network switch 111B/111C/111D in a TSN network (e.g., the TSN network 110).

To begin with, the network device reports the information of packet routing to the CNC server (e.g., the CNC server 113) in the TSN network (step S310), and receives a mapping (or update of the mapping) of stream IDs to VLAN tags from the CNC server (step S320). The details of the reported information will be described later in FIG. 6.

Subsequent to step S320, the network device receives a packet and determines whether the packet includes a VLAN tag (step S330).

Subsequent to step S330, if the packet includes a VLAN tag, the network device determines the stream ID of the packet (step S340).

In one embodiment, the stream ID may refer to at least one of the Ethertype and the Subtype (e.g., the first byte of the payload field) of the packet.

In another embodiment, the stream ID may refer to the combination of the DA and the SA of the packet.

Subsequent to step S340, the network device determines whether the stream ID of the packet matches one of the stream IDs in the mapping (step S350).

Subsequent to step S350, if the stream ID of the packet matches one of the stream IDs in the mapping (i.e., there is a match), the network device replaces the VLAN tag in the packet with the VLAN tag corresponding to the matched stream ID in the mapping (step S360), and routes the packet according to its current header fields (step S370), and the method ends.

Returning to step S330, if the packet does not include a VLAN tag, the method proceeds to step S370.

Returning to step S350, if the stream ID of the packet does not match any of the stream IDs in the mapping (i.e., there is no match), the method proceeds to step S370.

Figure 4:
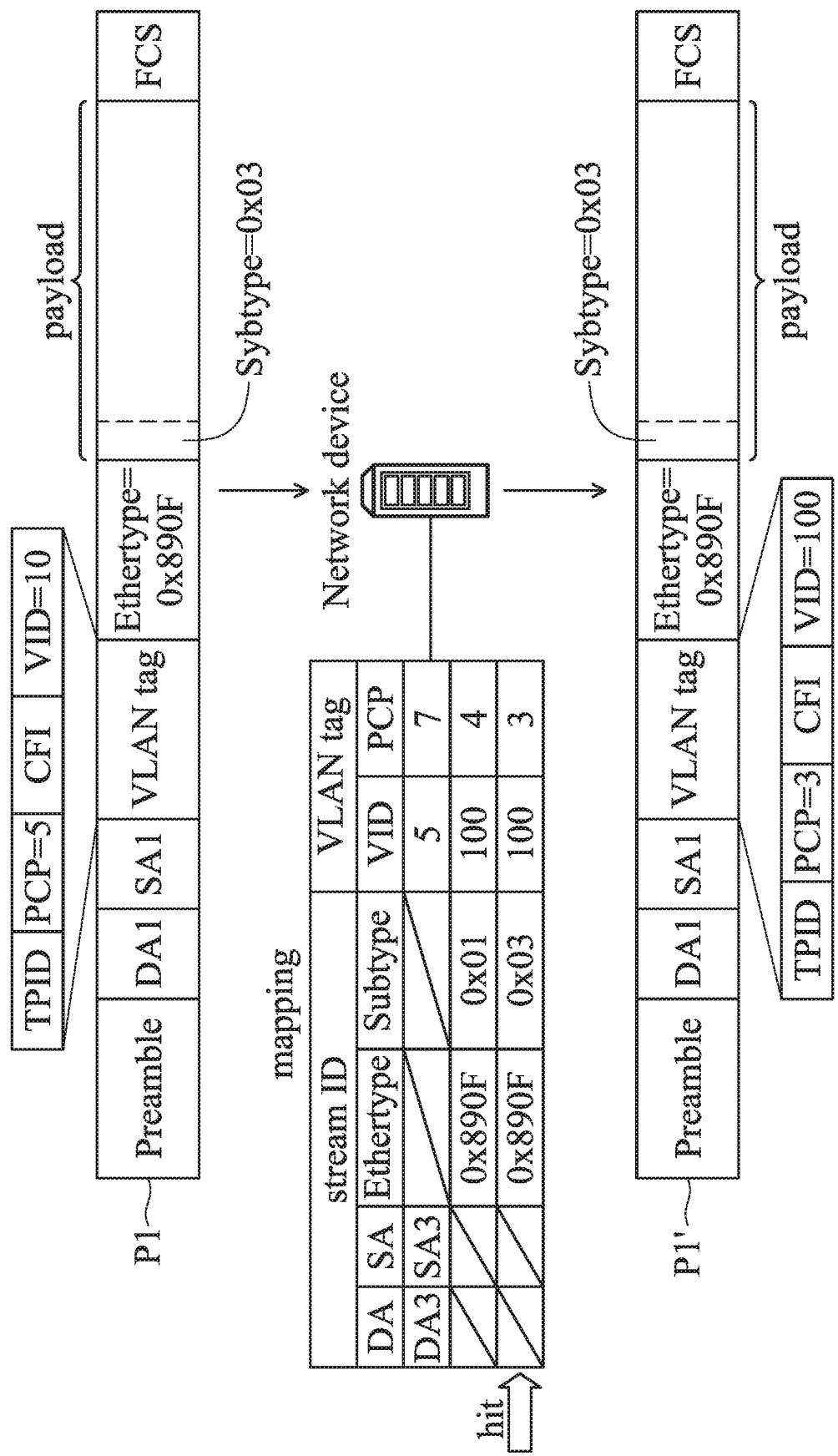
FIG. 4 is a schematic diagram illustrating the VLAN tag replacement according to an embodiment of the application.

FIG. 4 is a schematic diagram illustrating the VLAN tag replacement according to an embodiment of the application.

In one embodiment, the packet P1 may be received from the non-TSN network 120 by the network gateway 111A, and the VLAN tag in the packet P1 is replaced according to the mapping received from the CNC server 113, thereby generating the packet P1' to be routed in the TSN network 110.

In another embodiment, the packet P1 may be received at the network switch 111B/111C/111D from another apparatus (e.g., the network switch 111B/111C/111D or the terminal devices 112A-112D) in the TSN network 110, and the VLAN tag in the packet P1 is replaced according to the mapping received from the CNC server 113, thereby generating the packet P1' to be routed in the TSN network 110.

As shown in FIG. 4, the mapping specifies the correspondences between a plurality of stream IDs and a plurality of VLAN tags, wherein each of the stream IDs is presented as a combination of a DA and an SA or as a combination of an Ethertype and a Subtype (e.g., the first byte of the payload field), while each of the VLAN tags is presented as a combination of a VID and a PCP.

For example, in the mapping, the combination of a DA with a value denoted as DA3 and an SA with a value denoted as SA3 indicates that the protocol encapsulated in a packet is EtherCAT. The combination of an Ethertype with a hexadecimal value of 0x890F and a Subtype with a hexadecimal value of 0x00~0xBF indicates that the protocol encapsulated in a packet is Control and Communication Link using Industrial Ethernet (CC-Link IE) Controller or Field.

The packet P1 includes a 8-byte preamble field, a 6-byte Destination Address (DA) field, a 6-byte Source Address (SA) field, a 4-byte VLAN tag, a 2-byte Ethertype field, a payload with the first byte being a Subtype field, and a 4-byte Frame Check Sequence (FCS) field.

In particularly, the hexadecimal value of the Ethertype field of the packet P1 is 0x890F, and the hexadecimal value of the Subtype field of the packet P1 is 0x03. The VLAN tag includes a 2-byte Tag Protocol Identifier (TPID) field, a 3-bits PCP field, a 1-bit Canonical Format Indicator (CFI) field, and a 12-bit VID filed, wherein the decimal value of the PCP field is 5 and the decimal value of the VID field is 10.

The network device looks up the mapping and finds that there's a match for the combination of the Ethertype and the Subtype of the packet P1. Specifically, the combination of Ethertype=0x890F and Subtype=0x03 corresponds to a combination of VID=100 and PCP=3.

In response to the match, the network device replaces the VID=10 and PCP=5 in the packet P1 with the VID=100 and PCP=9 corresponding to Ethertype=0x890F and Subtype=0x03 in the mapping, thereby transforming the packet P1 into packet P1'.

Please note that only the VID and PCP fields in the packet P1 are replaced, while the other fields in the packet P1 remain unchanged.

Figure 5:
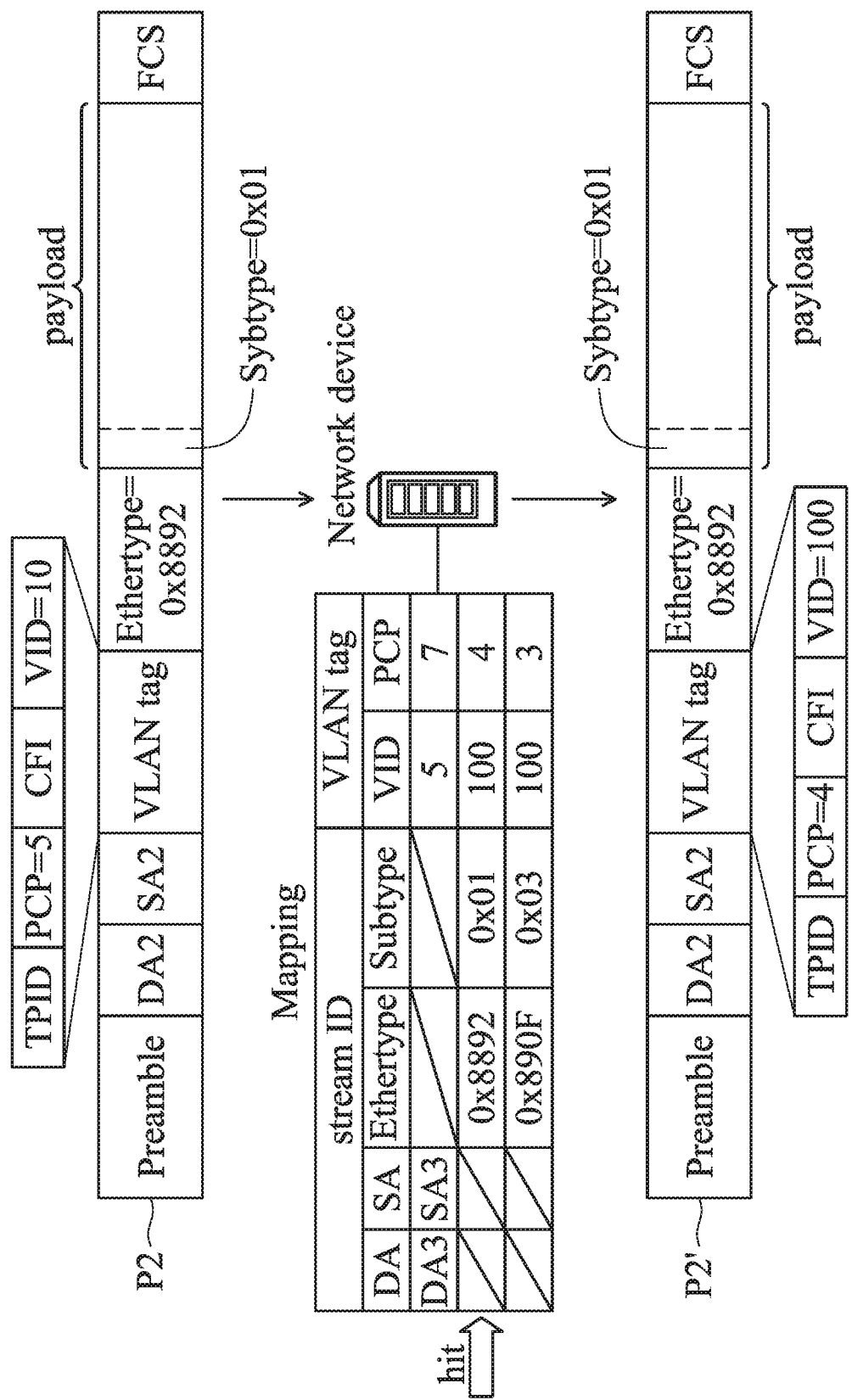
FIG. 5 is a schematic diagram illustrating the VLAN tag replacement according to another embodiment of the application.

FIG. 5 is a schematic diagram illustrating the VLAN tag replacement according to another embodiment of the application.

In one embodiment, the packet P2 may be received from the non-TSN network 120 by the network gateway 111A, and the VLAN tag in the packet P2 is replaced according to the mapping received from the CNC server 113, thereby generating the packet P2' to be routed in the TSN network.

In another embodiment, the packet P2 may be received at the network switch 111B/111C/111D from another apparatus (e.g., the network switch 111B/111C/111D or the terminal devices 112A-112D) in the TSN network 110, and the VLAN tag in the packet P2 is replaced according to the mapping received from the CNC server 113, thereby generating the packet P2' to be routed in the TSN network 110.

As shown in FIG. 5, the mapping specifies the correspondences between a plurality of stream IDs and a plurality of VLAN tags, wherein each of the stream IDs is presented as a combination of a DA and an SA or as a combination of an Ethertype and a Subtype (e.g., the first byte of the payload field), while each of the VLAN tags is presented as a combination of a VID and a PCP.

For example, in the mapping, the combination of a DA with a value denoted as DA3 and an SA with a value denoted as SA3 indicates that the protocol encapsulated in a packet is EtherCAT. The combination of an Ethertype with a hexadecimal value of 0x890F and a Subtype with a hexadecimal value of 0x00~0xBF indicates that the protocol encapsulated in a packet is CC-Link IE Controller or Field.

The packet P2 includes a 8-byte preamble field, a 6-byte DA field, a 6-byte SA field, a 4-byte VLAN tag, a 2-byte Ethertype field, a payload with the first byte being a Subtype field, and a 4-byte FCS field.

In particularly, the hexadecimal value of the Ethertype field of the packet P2 is 0x8892, and the hexadecimal value of the Subtype field is 0x01. The VLAN tag includes a 2-byte TPID field, a 3-bits PCP field, a 1-bit CFI field, and a 12-bit VID filed, wherein the decimal value of the PCP field is 5 and the decimal value of the VID field is 10.

The network device looks up the mapping and finds that there's a match for the combination of the Ethertype and the Subtype of the packet P1. Specifically, the combination of Ethertype=0x8892 and Subtype=0x01 corresponds to a combination of VID=100 and PCP=4.

In response to the match, the network device replaces the VID=10 and PCP=5 in the packet P2 with the VID=100 and PCP=4 corresponding to Ethertype=0x8892 and Subtype=0x01 in the mapping, thereby transforming the packet P2 into packet P2'.

Please note that only the VID and PCP fields in the packet P2 are replaced, while the other fields in the packet P2 remain unchanged.

Figure 6:
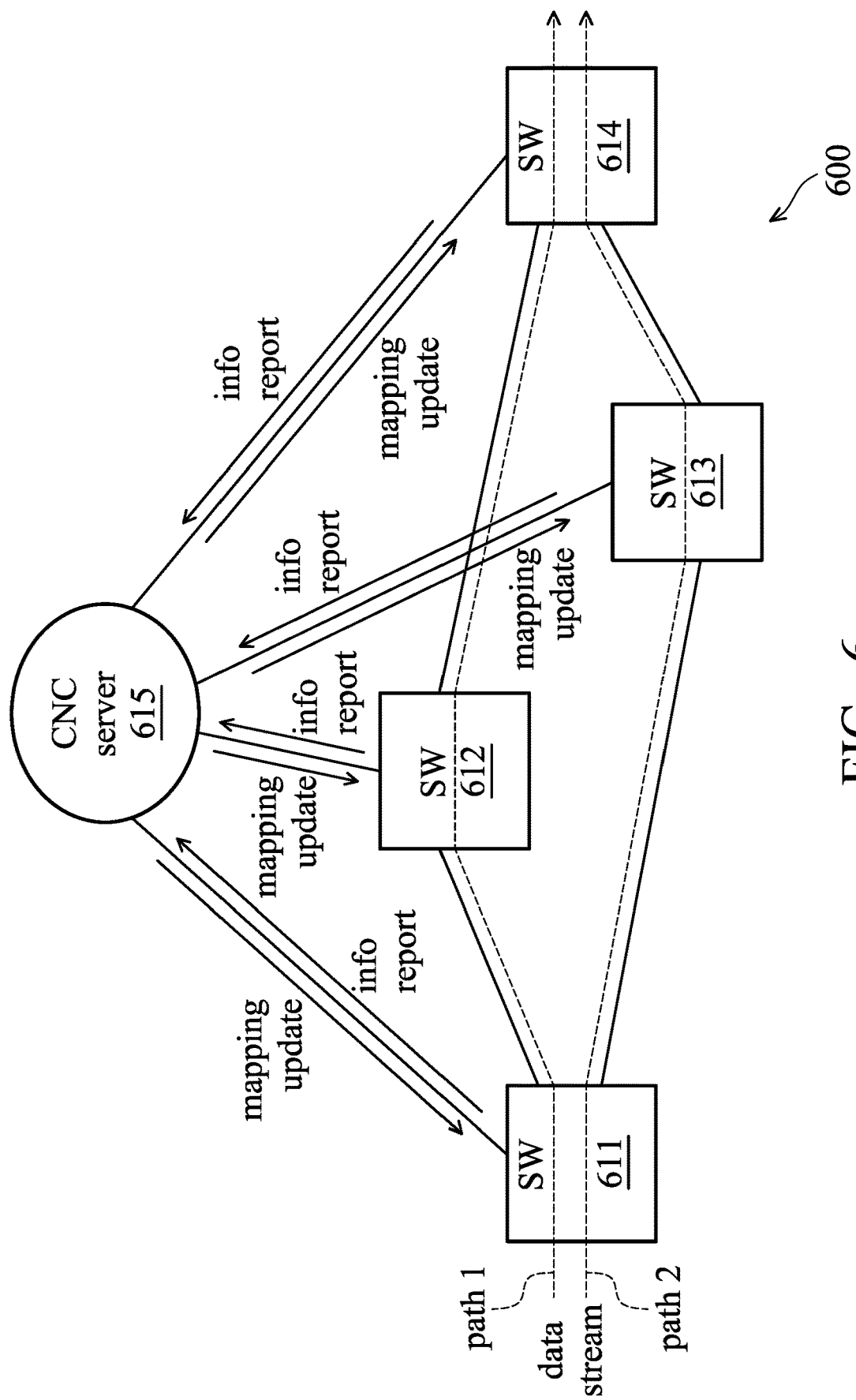
FIG. 6 is a schematic diagram illustrating the update of the mappings for the network switches according to an embodiment of the application.

FIG. 6 is a schematic diagram illustrating the update of the mappings for the network devices according to an embodiment of the application.

As shown in FIG. 6, a TSN network 600 includes a plurality of network devices 611~614 and a CNC server 615, wherein each of the network devices 611 and 614 is connected with both the network devices 612 and 613, but the network devices 611 and 614 are not directly connected to each other.

A data stream is routed through the TSN network 600 using path 1 in the first place. The path 1 starts from the network device 611, and continues through the network devices 612 and 614 in sequence.

In the meantime, the network devices 611~614 may report the information of packet routing to the CNC server 615, and the CNC server 615 may update the mappings for the network devices 611~614 according to the reported information. In response to the mappings being updated, the network devices 611~614 may route the data stream through the TSN network 600 using another path (denoted as path 2 in FIG. 6), by replacing VLAN tags in the packets of the data stream according to the mappings as described in the embodiments of FIGS. 3~5.

In one embodiment, the reported information may include timestamps of packets of the data stream, which indicate the time of the packets arriving at or departing from the network devices 611~614. Specifically, the CNC server 615 may determine the latency of the data stream according to the timestamps, and the update of the mappings is performed in response to the latency of the data stream being greater than a predetermined threshold.

In another embodiment, the reported information may include the loadings of the network devices 611~614 for packet routing. For example, the loading of a network device may be associated with the usage level(s) of the ingress queue and/or the egress queue for storing the packets to be routed by the network device. If the ingress queue and/or the egress queue is/are being used up, it means the network device is heavy loaded. Specifically, the CNC server 615 may determine to perform the update of the mappings in response to that the loading of the network device 612 (with which the communication path 1 is associated) is greater than a predetermined threshold but the loading of the network device 613 (with which the communication path 2 is associated) is less than the predetermined threshold.

In view of the forgoing embodiments, it will be appreciated that the present application realizes interoperability between TSN networks and non-TSN networks and maintains the real-time deterministic behavior of delivering data stream in the TSN networks, by replacing the VLAN tags in the packets routed from non-TSN networks to TSN networks according to a mapping that is dynamically updated based on the latency of the data streams or the loadings of the network switches in the TSN networks.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. An apparatus, comprising:
   a storage medium, configured to store a mapping of a plurality of first stream Identifiers (IDs) to a plurality of first Virtual Local Area Network (VLAN) tags; and
   a controller, coupled to the storage medium, and configured to route a packet for a Time-Sensitive Networking (TSN) network according to the mapping;
   wherein the routing of the packet comprises:
   identifying a second stream ID of the packet;
   determining whether the second stream ID matches one of the first stream IDs in the mapping; and in response to the second stream ID matching one of the first stream IDs in the mapping, replacing a second VLAN tag in the packet with the first VLAN tag which corresponds to the first stream ID matching the second stream ID in the mapping.

2. The apparatus as claimed in claim 1, wherein each of the first stream IDs and the second stream ID is presented as any combination of the following:
  a Destination Address (DA);
  a Source Address (SA);
  a VLAN ID (VID);
  a Priority Code Point (PCP);
  an Ethertype; and
  a Subtype.

3. The apparatus as claimed in claim 2, wherein each of the first stream IDs and the second stream ID is presented as a combination of the Ethertype and the Subtype, and the Ethertype is a header field of an Ethernet packet in compliance with TSN standards specified by Institute of Electrical and Electronics Engineers (IEEE) 802.1 working groups, while the Subtype is a portion of a payload field of the Ethernet packet.

4. The apparatus as claimed in claim 2, wherein each of the first stream IDs and the second stream ID is presented as a combination of the DA and the SA, and the DA and the SA are header fields of an Ethernet packet in compliance with TSN standards specified by Institute of Electrical and Electronics Engineers (IEEE) 802.1 working groups.

5. The apparatus as claimed in claim 1, wherein each of the first VLAN tags and the second VLAN tag comprises a VLAN ID (VID) and a Priority Code Point (PCP), and the VID and the PCP are header fields in an Ethernet packet in compliance with TSN standards specified by Institute of Electrical and Electronics Engineers (IEEE) 802.1 working groups.

6. The apparatus as claimed in claim 1, wherein the apparatus is a network gateway which supports interoperability between the TSN network and a non-TSN network in response to the packet being routed between the TSN network and the non-TSN network by the network gateway; or the apparatus is a network switch which supports TSN communication within the TSN network in response to the packet being routed in the TSN network by the network switch.

7. A method, executed by an apparatus connected to a Time-Sensitive Networking (TSN) network, the method comprising:
  routing a packet for the TSN network according to a mapping of a plurality of first stream Identifiers (IDs) to a plurality of first Virtual Local Area Network (VLAN) tags;
  wherein the routing of the packet comprises:
  identifying a second stream ID of the packet;
  determining whether the second stream ID matches one of the first stream IDs in the mapping; and
  in response to the second stream ID matching one of the first stream IDs in the mapping, replacing a second VLAN tag in the packet with the first VLAN tag which corresponds to the first stream ID matching the second stream ID in the mapping.

8. The method as claimed in claim 7, wherein each of the first stream IDs and the second stream ID is presented as any combination of the following:
  a Destination Address (DA);
  a Source Address (SA);
  a VLAN ID (VID);
  a Priority Code Point (PCP);
  an Ethertype; and
  a Subtype.

9. The method as claimed in claim 8, wherein each of the first stream IDs and the second stream ID is presented as a combination of the Ethertype and the Subtype, and the Ethertype is a header field of an Ethernet packet in compliance with TSN standards specified by Institute of Electrical and Electronics Engineers (IEEE) 802.1 working groups, while the Subtype is a portion of a payload field of the Ethernet packet.

10. The method as claimed in claim 8, wherein each of the first stream IDs and the second stream ID is presented as a combination of the DA and the SA, and the DA and the SA are header fields of an Ethernet packet in compliance with TSN standards specified by Institute of Electrical and Electronics Engineers (IEEE) 802.1 working groups.

11. The method as claimed in claim 7, wherein each of the first VLAN tags and the second VLAN tag comprises a VLAN ID (VID) and a Priority Code Point (PCP), and the VID and the PCP are header fields in an Ethernet packet in compliance with TSN standards specified by Institute of Electrical and Electronics Engineers (IEEE) 802.1 working groups.

12. The method as claimed in claim 7, wherein the apparatus is a network gateway which supports interoperability between the TSN network and a non-TSN network in response to the packet being routed between the TSN network and the non-TSN network by the network gateway; or the apparatus is a network switch which supports TSN communication within the TSN network in response to the packet being routed in the TSN network by the network switch.

13. A Central Network Configuration (CNC) server, comprising:
  a network interface device, configured to provide connections to a first apparatus and a second apparatus in a Time-Sensitive Networking (TSN) network;
  a controller, coupled to the network interface device; and
  a storage medium, configured to store computer-readable instructions which, when loaded and executed by the controller, cause the controller to receive from the first apparatus and the second apparatus information of routing a packet between the first apparatus and the second apparatus, and update a respective mapping of a plurality of first stream Identifiers (IDs) to a plurality of first Virtual Local Area Network (VLAN) tags in each of the first apparatus and the second apparatus according to the information, thereby enabling each of the first apparatus and the second apparatus to replace a second VLAN tag in the packet with the first VLAN tag which corresponds to a second stream ID of the packet according to the mappings;
  wherein the information comprises a first loading of the first apparatus for packet routing, and a second loading of the second apparatus for packet routing; and the updating of the mappings in the first apparatus and the second apparatus is performed in response to one of the first loading and the second loading being greater than a predetermined threshold.

14. The CNC server as claimed in claim 13, wherein the information comprises:
  a first timestamp of the packet, which indicates the time of the packet arriving at or departing from the first apparatus; and
  a second timestamp of the packet, which indicates the time of the packet arriving at or departing from the second apparatus.

15. The CNC server as claimed in claim 14, wherein the controller is further configured to determine a latency of the packet routed between the first apparatus and the second apparatus according to the first timestamp and the second timestamp, and the updating of the mappings in the first apparatus and the second apparatus is performed in response to the latency of the packet being greater than a predetermined threshold.

16. The CNC server as claimed in claim 13, wherein the first apparatus or the second apparatus is a network gateway which supports interoperability between the TSN network and a non-TSN network, or is a network switch which supports TSN communication within the TSN network.

\* \* \* \* \*